US008476516B2

(12) United States Patent
Wohltan

(10) Patent No.: US 8,476,516 B2
(45) Date of Patent: Jul. 2, 2013

(54) FINGER POSITIONER FOR MUSICIANS

(76) Inventor: Sighard H. Wohltan, Vienna (AT)

( * ) Notice: Subject to any disclaimer, the term of this patent is extended or adjusted under 35 U.S.C. 154(b) by 0 days.

(21) Appl. No.: 13/380,976

(22) PCT Filed: Jun. 28, 2010

(86) PCT No.: PCT/AT2010/000234
§ 371 (c)(1),
(2), (4) Date: Feb. 25, 2012

(87) PCT Pub. No.: WO2011/000010
PCT Pub. Date: Jan. 6, 2011

(65) Prior Publication Data
US 2012/0279374 A1 Nov. 8, 2012

(30) Foreign Application Priority Data
Jun. 29, 2009 (AT) ................. A 1004/2009

(51) Int. Cl.
*G10D 9/00* (2006.01)
(52) U.S. Cl.
USPC .......................................... 84/453

(58) Field of Classification Search
USPC .............................................. 84/315–322, 453
See application file for complete search history.

(56) References Cited

U.S. PATENT DOCUMENTS

| | | | | |
|---|---|---|---|---|
| 6,160,212 A | * | 12/2000 | Morse | 84/315 |
| 2006/0137511 A1 | * | 6/2006 | McGregor | 84/478 |
| 2009/0056521 A1 | * | 3/2009 | Goad | 84/320 |

* cited by examiner

*Primary Examiner* — Kimberly Lockett

(57) ABSTRACT

The invention relates to a finger positioner that facilitates playing musical instruments. The finger positioner comprises a wedge (1), which is positioned between two adjacent fingers of the fretting hand and in parallel to said fingers so that the wedge spreads the bent fingers in the area of the distal phalanges of the fingers, wherein the narrowly tapering end of the wedge points at the palm and wherein at least one pin (2; 3; 7) is provided, which penetrates the wedge in the transverse direction and lies against the inside of two adjacent fingers and thus holds the wedge in the correct position. In order to avoid tilting, the wedge is approximately as long as the fingers or is held in position by a further pin. The longitudinal section of the wedge (1) can be bent similar to the fingers of the fretting hand. The pins (2; 3; 7) can be straight or slightly bent and protrude from both sides of the wedge (1) by approximately half a finger width.

6 Claims, 8 Drawing Sheets

Figure 1:
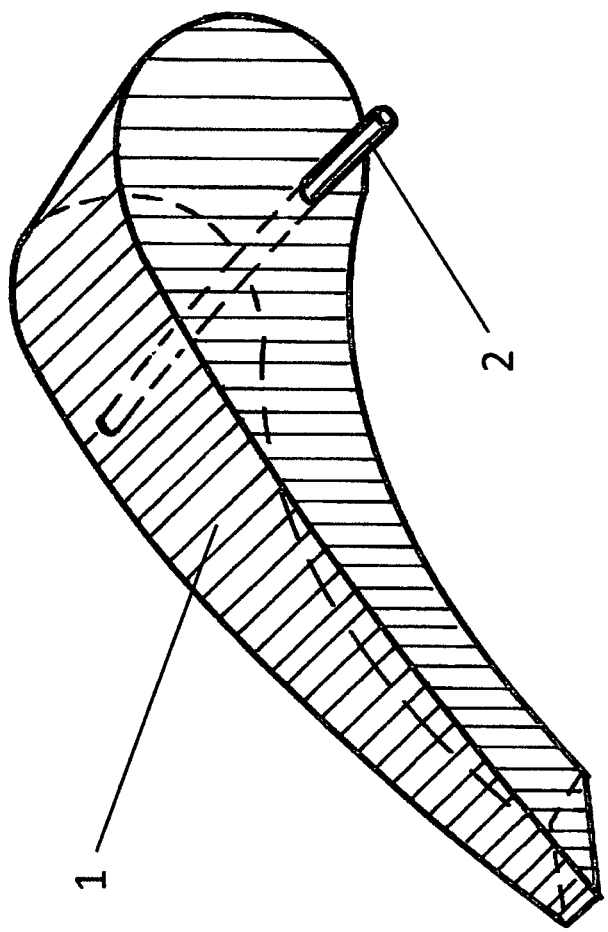

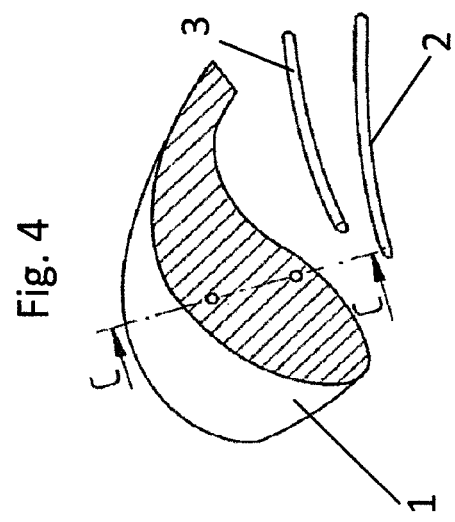
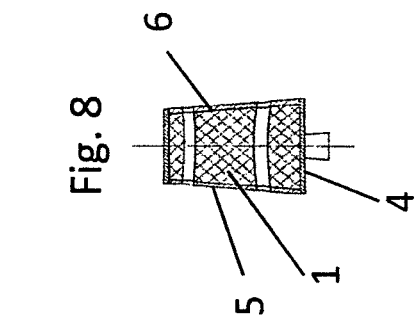
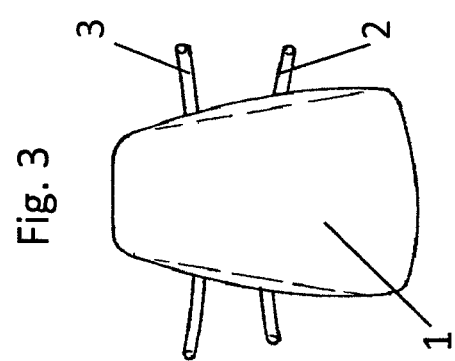
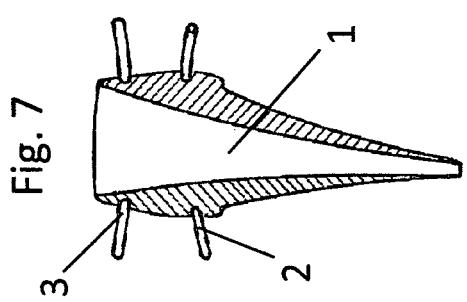
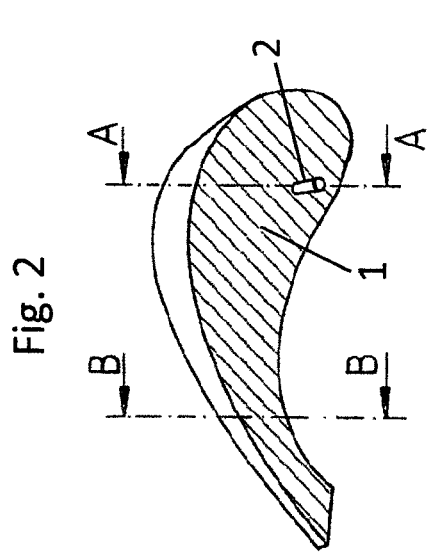
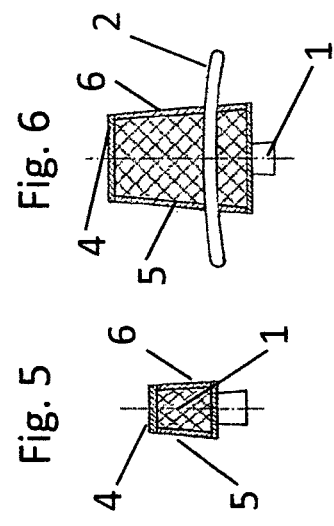

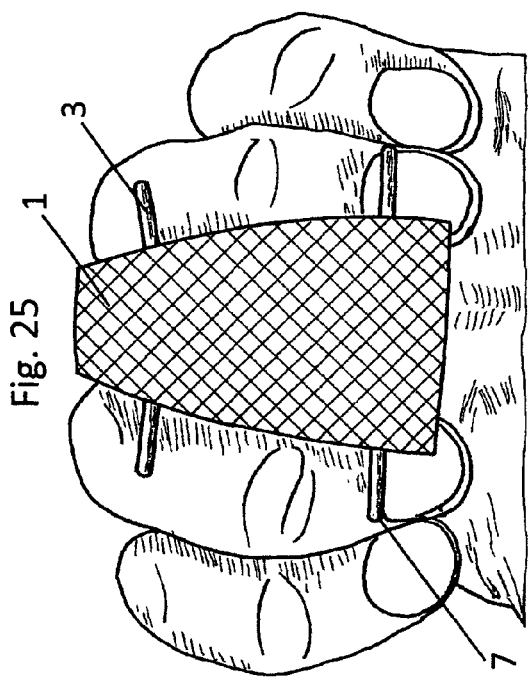
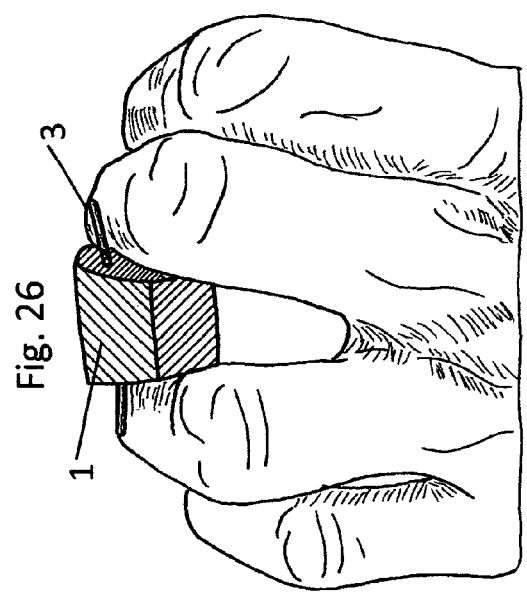
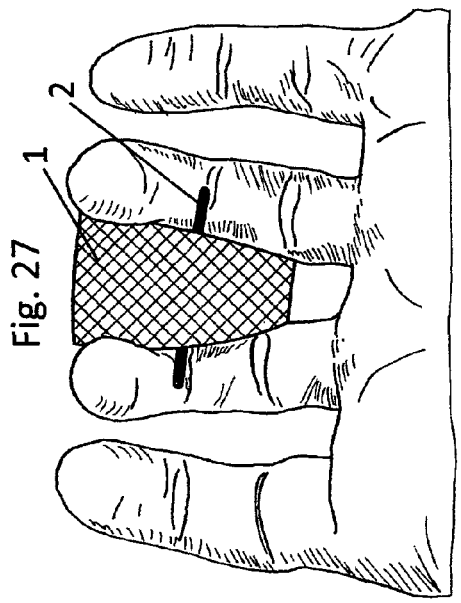

FINGER POSITIONER FOR MUSICIANS

The invention relates to a finger positioner which facilitates the playing of sound sequences and chords in which a spreading of the fingers is necessary. The finger positioner positions the fingers at the correct position of the musical instrument. It consists of a wedge and one or more pins. The wedge forms the shape of the intermediate space between two adjacent fingers and is held in position by its own shape and the pins.

The spreading of the fingers is important for musicians in many musical passages. Apparatuses are known (U.S. Pat. No. 5,136,911 from the year 1992) which enable a fixing of the fingers in a spread position. The fixing of fingers by rings on a rod allows no spreading beyond the fixed dimension. The apparatus is also not suitable for playing chord changes and sound sequences because the fingers cannot move freely and no free vibration of the strings is possible on stringed instruments.

A grip adapter with a thumb spreading element and gripping tines for the other fingers is known (DE 202007004665 U1 from 2008). The apparatus is fastened to the hand and/or to the underarm and lies between index finger and thumb. Due to the position in the palm of the hand, a sufficiently close approach of the gripping hand is not possible in the case of broader gripping necks of guitars. In the case of violins a collision of the apparatus with the neck of the instrument is also possible. A fastening to the underarm or to the hand is unpleasant for many musicians and restricts the possibility of movement.

A fixing of the fingers by an elastic suspension (U.S. Pat. No. 4,961,568 from 1990) allows the spreading of the fingers in the curved state but is restricted to three fingers and does not allow any playing of instruments since the apparatus is not intended for musicians but for baseball players.

A spreading of the fingers by finger plates on a base plate (U.S. Pat. No. 806,681 from 1905), (U.S. Pat. No. 886,591 from 1908) does not allow any practicing with the instrument but is intended to spread the fingers and then play with the instrument. The spreading of the fingers is accomplished in a stretched position and therefore does not reflect the necessary spreading of the curved fingers.

It is therefore the object of the invention to configure an apparatus for positioning of the fingers of the gripping hand of musicians such that the positioning can be accomplished when playing the instrument and that the movement of the fingers when using the apparatus is as similar as possible to the correct movement without the apparatus and is not restricted by the apparatus.

The invention solves the formulated object whereby the fingers are spread by a wedge in the form of an arched profile of a bird wing in the intermediate space between two adjacent fingers and can spread further along pins.

Since the fingers are supported in their natural position by these measures, it is possible to play the instrument whilst simultaneously using the finger positioner. The curved shape of the wedge enables the strings to vibrate freely on stringed instruments. Both individual sound sequences and chords can be played. Particular advantages are obtained for barre grips which frequently require the spreading of individual fingers. Since the specific spreading of individual fingers is produced by the pre-set finger positioner, other fingers can press onto the strings in the relaxed correct position. This makes it possible to support a correct hand hold when learning demanding fingerings.

The wedge is preferably made of light material, e.g. hard, dimensionally stable foam, in order to have as little as possible adverse effect on the playing of the instrument by the weight that has to be moved by the fingers. The surfaces of the wedge lying against the fingers are preferably made of skin-tolerable materials such as felt, leather or plastic which give a good compromise between scope for friction and sliding.

A further effect is the increased flexing of the distal phalanx by pins. This flexing is important for clean playing because when the position of the distal phalanges is as vertical as possible, adjacent strings are not dampened. Sometimes the distal phalanx is stretched out by beginners which can lead to a cramped position and to lower circulation. The finger positioner helps to learn a correct flexing of the distal phalanx and avoids becoming accustomed to incorrect positions.

The playing of chords frequently requires the simultaneously placement of fingers. The two adjacent spread fingers are connected by the finger positioner and can thus very simply depress their particular strings simultaneously.

Due to the placement of the wedge in the area of the finger metacarpophalangeal joint, the hand remains at a favorable distance from the fingerboard since it is not possible to remove the hand too far from the fingerboard due to the fixedly predefined distance of the pin from the narrow end of the wedge.

The use of straight or slightly curved pins has the advantage compared with rings in other devices for finger spreading that the finger positioner proposed here is independent of different finger diameters. The position of the pins can easily be adapted to different hand geometries. The wedges can either be provided with a plurality of pre-fabricated holes, when using straight pins or curved tubes when using curved pins. It is even simpler to pierce the foam material at the desired place by means of a pointed pin and then insert the pin into the tube thus made.

The inventive subject matter is shown as an example in the drawing. FIGS. 1 to 8 show the wedge and the pins each from different angles of observation and in sectional views. FIGS. 9 to 20 show the inventive subject matter in different possible applications for the example of a guitar for right-handed persons. FIGS. 21 to 24 show an alternative exemplary embodiment in the form of a note head with three pins and FIGS. 25 to 27 show these finger positioners in the gripping hand of a musician.

According to the exemplary embodiment shown, the finger positioner consists of a wedge 1 and a lower pin 2 as well as an optional upper pin 3. "Bottom" relates to the finger side opposite the finger nails; "top" is the side of the finger nails. FIG. 3 shows the wedge from the front, in the finger nail viewing direction. FIG. 2 shows an oblique side view in the viewing direction of the little finger. FIG. 6 is the section A-A through FIG. 2 and shows the wedge 1 and the slightly downwardly bent pin 2. The gentle sloping position of the two side parts in an A-shape is important. This sloping position produces the spreading of the fingers primarily in the region of the distal phalanges near the finger tips. In this sectional view the wedge 1 is shown with optional side cladding 5 and 6. The cladding should be made of highly skin-friendly materials such as leather, felt, cloth, foamed rubber or similar. The optional cladding of the upper and lower side 4 can be of the same material as the side cladding 5 and 6. On the upper and lower side the skin compatibility is less important because the fingers do not rest here. FIG. 5 shows the section B-B through FIG. 2 and reveals that the wedge becomes increasingly narrower toward the rear. FIG. 7 shows the finger positioner from the rear, in the viewing direction of the back of the hand. In FIG. 4 the two pins 2 and 3 are pulled out from the wedge 1 and lie near this. FIG. 4 shows an oblique view in the direction of the thumb. FIG. 8 shows the section C-C through FIG. 4. The two tubes for the pins can be seen. The lower tube is bent downward. The upper tube is bent upward. A better ergonomy is achieved with bent pins since these abut tangentially against the fingers.

Figure 10:
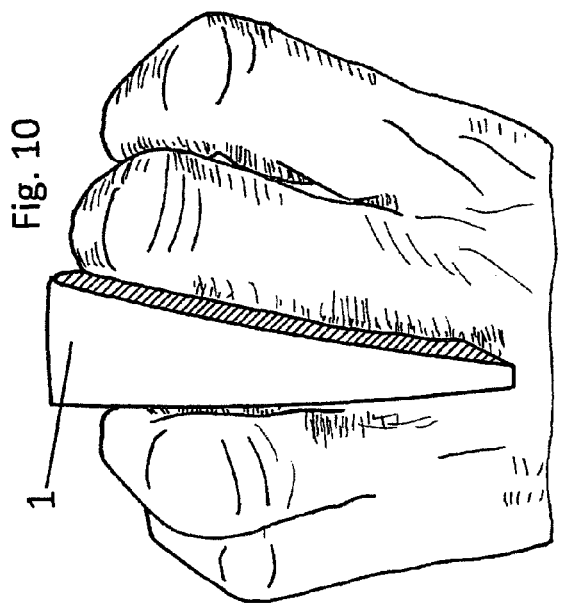
Figure 9:
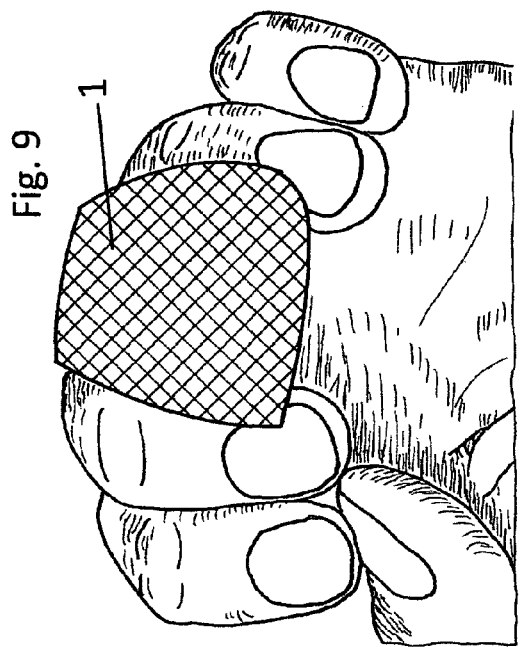
Figure 11:
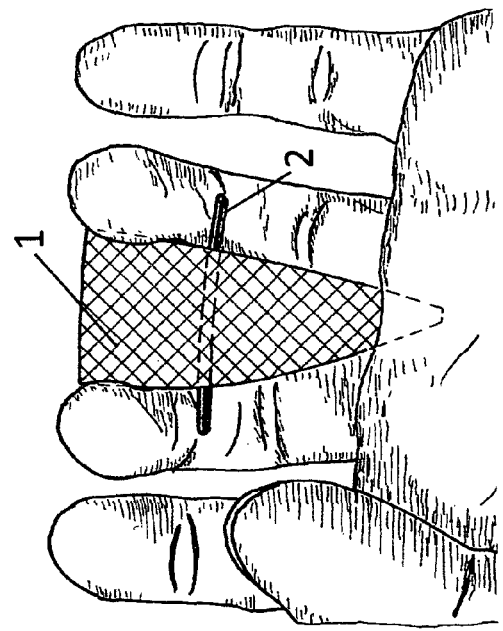

FIG. 9 shows the finger positioner from the front, in the fingernail viewing direction. In FIG. 10 the wedge 1 can be seen from above and behind, in the viewing direction of the back of the hand. FIG. 11 shows the finger positioner from below, in the viewing direction of the hand inner surface. It can be clearly seen that the pin 2 lies in the distal phalange of the middle and ring finger. The narrow end of the wedge 1 is shown by the dashed line and it can be seen that it rests in the area of the metacarpophalangeal joint of the middle and ring finger and any tilting of the wedge downward would thus be avoided.

Figure 12:
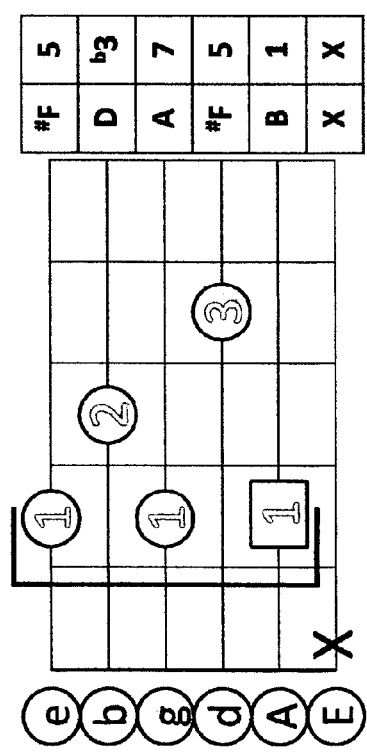
Figure 13:
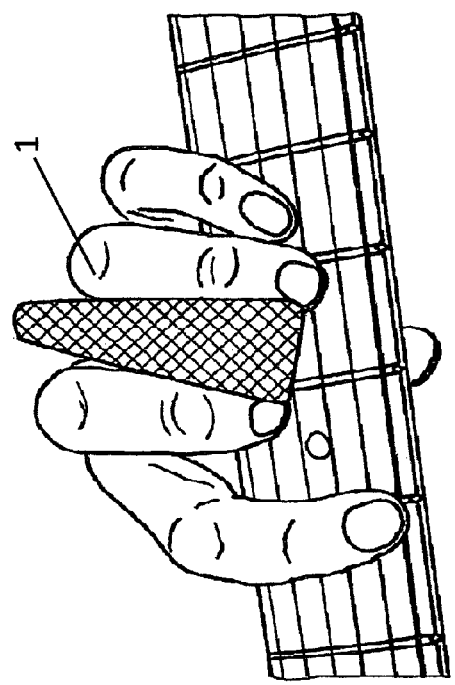
Figure 14:
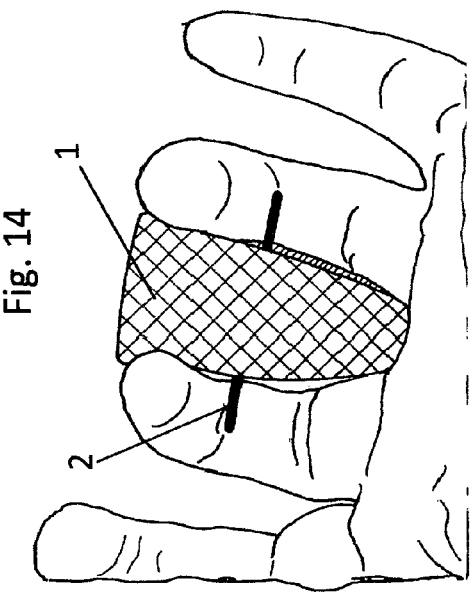

FIG. 13 shows an application for the example of the B-minor 7 barre chord for guitar. In this chord it is important that the middle and ring finger are spread widely and at the same time the index finger grips a barre chord over five strings. This spreading is particularly difficult for beginners to achieve. FIG. 12 shows the relevant chord diagram. The international designation of the notes has been selected which means that the note B corresponds to the note H in Austrian notation. FIG. 14 shows the view from below before the grip is fully placed.

Figure 15:
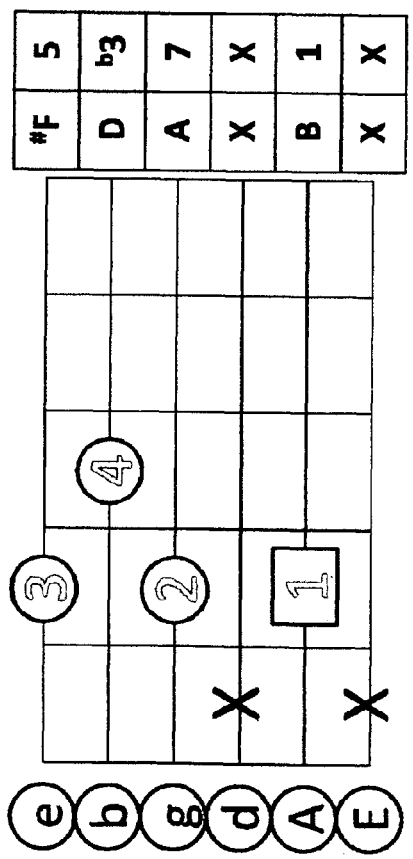
Figure 16:
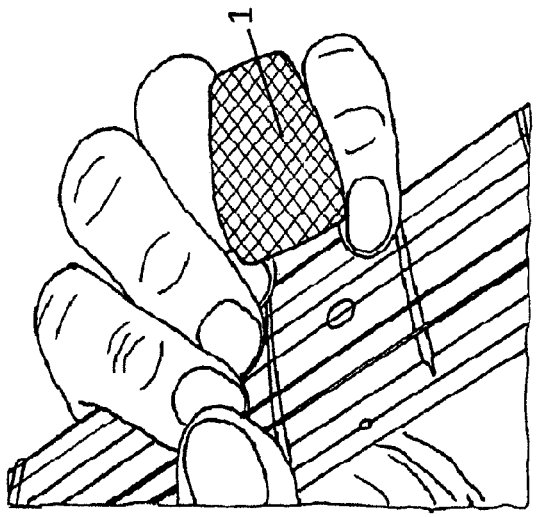
Figure 17:
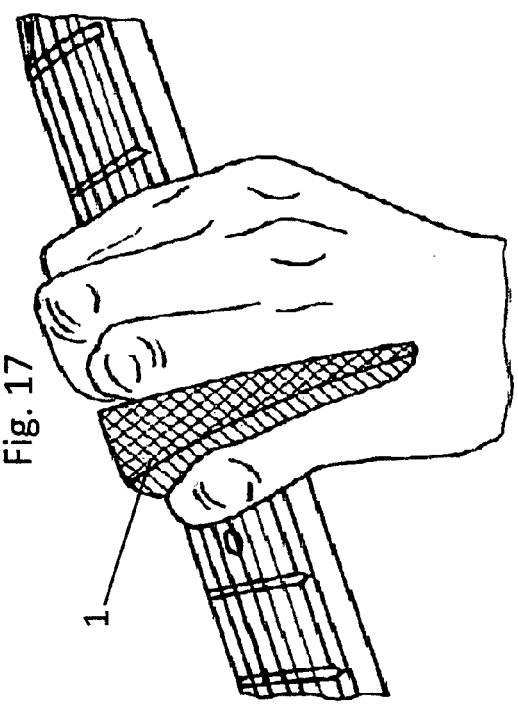

FIG. 16 shows an alternative B-minor 7 chord without barre grip. Here it can be seen that the spreading is accomplished between ring finger and little finger. FIG. 15 shows the relevant chord diagram. FIG. 17 shows the finger positioner from above and behind, in the viewing direction of the back of the hand.

Figure 19:
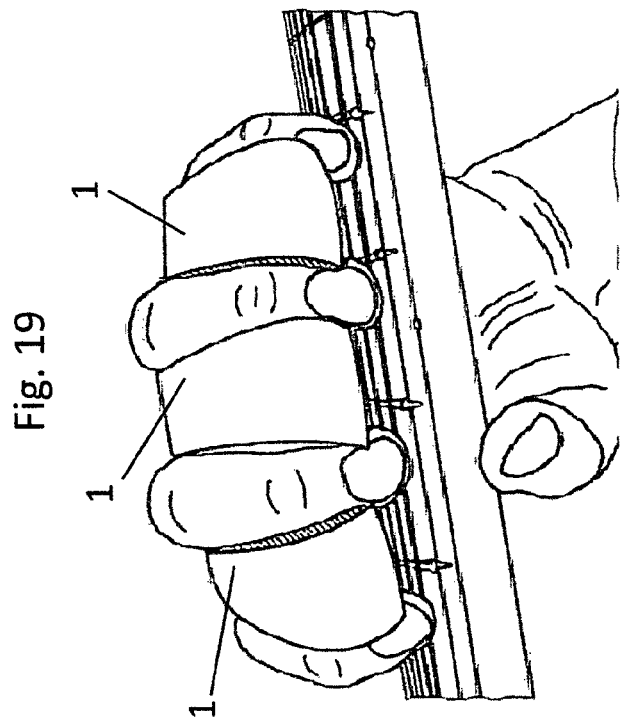
Figure 18:
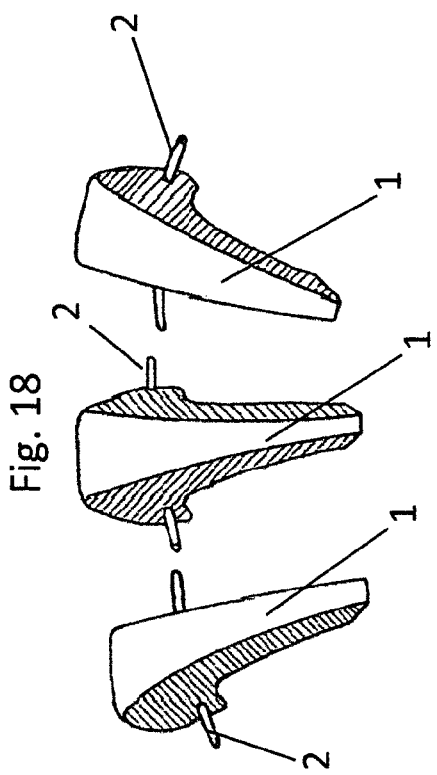
Figure 20:
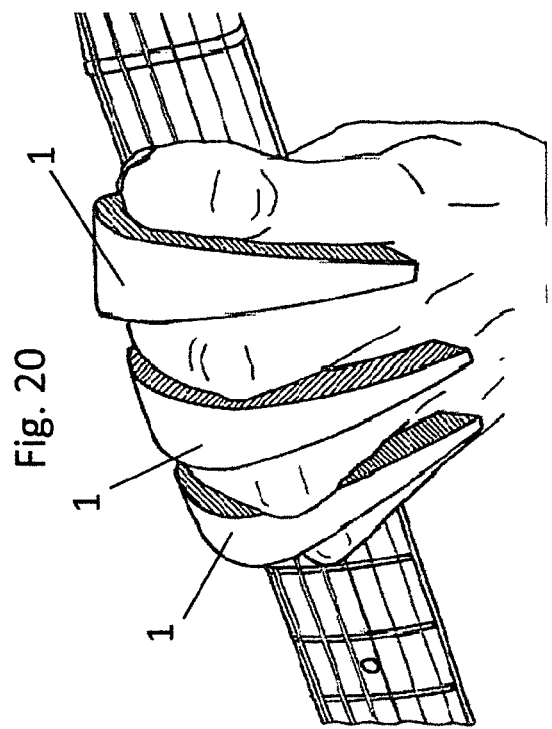

FIG. 19 shows that sound sequences can be played with three finger positioners. A good example is the chromatic scale. Here all four gripping fingers are spread. FIG. 18 shows the three finger positioners from behind, in the viewing direction of the back of the hand. FIG. 20 shows the three finger positioners when playing the chromatic scale in the viewing direction of the back of the hand.

Figure 21:
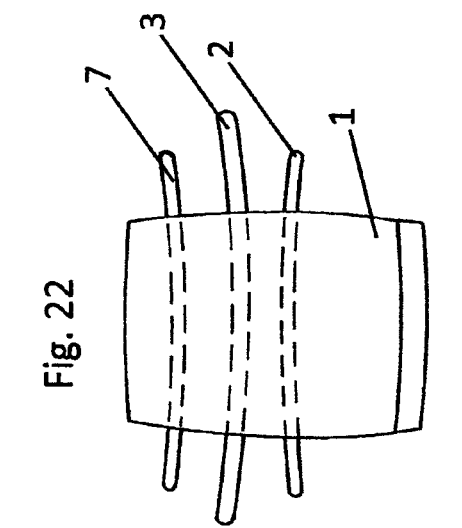
Figure 22:
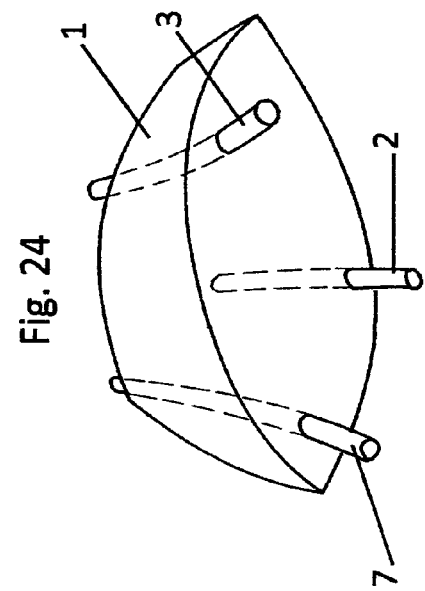
Figure 23:
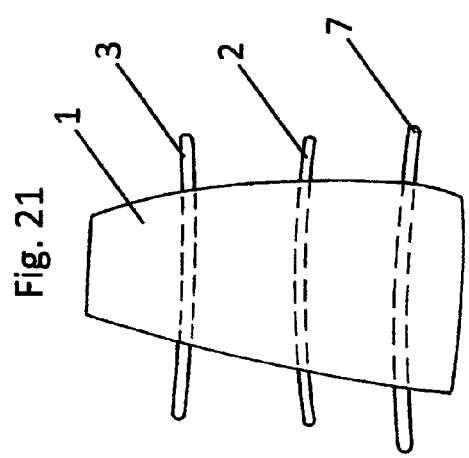
Figure 24:
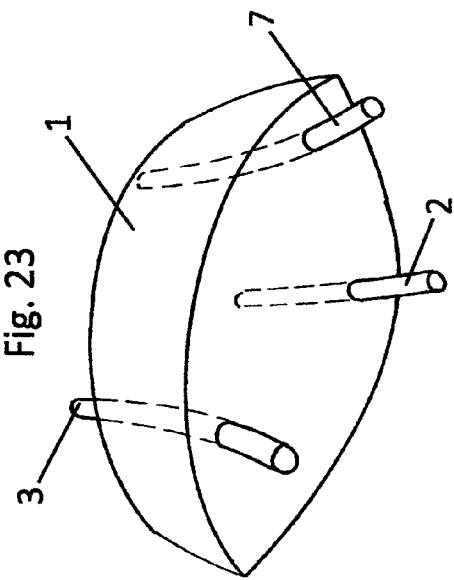

FIGS. 21 to 24 show an alternative exemplary embodiment with a shorter wedge 1 in the form of a note head with an optional third, front pin 7. FIG. 21 shows the view from the front from above. FIG. 22 shows the view from behind from above, in the viewing direction of the back of the hand. FIG. 23 shows an oblique side view with the viewing direction of the little finger. FIG. 24 shows an oblique side view in the viewing direction of the thumb. The optional front pin 7 thereby provides support, to flex the distal phalanx of the fingers well and keep them flexed. This is important because a placement of the distal phalanx enables a free sounding of the adjacent strings. In this exemplary embodiment, the pin 3 has the task of ensuring that the finger positioner cannot tilt downward. Thus, a long narrow end of the wedge which lies in the area of the finger metacarpophalangeal joints can be omitted.

FIG. 25 shows the wedge 1 with both pins 3 and 7, in the viewing direction of the fingernail. FIG. 26 shows the wedge 1 and the pin 3 from behind, in the viewing direction of the back of the hand. FIG. 27 shows the view in the direction of the inner hand surface. It can be clearly seen that the wedge 1 ends in the area of the middle phalanx of the finger and does not extend as far as the metacarpophalangeal joint of the finger.

The invention claimed is:

1. A finger positioner for facilitating the playing of a musical instrument, characterized in that a wedge is disposed between two adjacent curved fingers of a gripping hand and parallel to these fingers so that the wedge spreads the curved fingers in the area of the distal phalanges of the fingers, wherein the narrowly tapering end of the wedge points toward the palm of the hand and wherein at least one pin is provided which penetrates the wedge in the transverse direction and lies against the inside of two adjacent fingers and thus holds the wedge in the correct position.

2. The finger positioner according to claim 1, wherein the wedge has a length which approximately corresponds to the length of the fingers.

3. The finger positioner according to claim 1, wherein the wedge has a length which approximately corresponds to half the length of the fingers and which is positioned in the area of the middle phalanx and distal phalanx of the fingers.

4. The finger positioner according to claim 1 or 2, characterized in that the longitudinal section of the wedge is curved similarly to the fingers of the gripping hand.

5. The finger positioner according to claim 1, characterized in that the pins are straight or slightly curved.

6. The finger positioner according to claim 1, characterized in that the pins have a length such that they project from the wedge on both sides by approximately half a finger width.

* * * * *